(12) United States Patent
Usuda

(10) Patent No.: US 10,082,885 B2
(45) Date of Patent: Sep. 25, 2018

(54) INFORMATION INPUT AND OUTPUT APPARATUS AND INFORMATION INPUT AND OUTPUT METHOD

(71) Applicant: USUDA RESEARCH INSTITUTE & SYSTEMS CORPORATION, Tokyo (JP)

(72) Inventor: Hiroshi Usuda, Tokyo (JP)

(73) Assignee: USUDA RESEARCH INSTITUTE & SYSTEMS CORPORATION, Tokyo (JP)

( * ) Notice: Subject to any disclaimer, the term of this patent is extended or adjusted under 35 U.S.C. 154(b) by 233 days.

(21) Appl. No.: 15/120,042

(22) PCT Filed: Feb. 4, 2015

(86) PCT No.: PCT/JP2015/053073
§ 371 (c)(1),
(2) Date: Aug. 18, 2016

(87) PCT Pub. No.: WO2015/137014
PCT Pub. Date: Sep. 17, 2015

(65) Prior Publication Data
US 2017/0068333 A1 Mar. 9, 2017

(30) Foreign Application Priority Data
Mar. 13, 2014 (JP) ................. 2014-049701

(51) Int. Cl.
*G06F 3/0346* (2013.01)
*G06F 3/01* (2006.01)
(Continued)

(52) U.S. Cl.
CPC .......... *G06F 3/0346* (2013.01); *G06F 3/011* (2013.01); *G06F 3/016* (2013.01); *G06F 3/017* (2013.01);
(Continued)

(58) Field of Classification Search
CPC ............... G06F 3/017; G06F 3/0346; G06F 2203/0331; G06F 3/016
See application file for complete search history.

(56) References Cited

U.S. PATENT DOCUMENTS

| | | | |
|---|---|---|---|
| 5,832,296 A | 11/1998 | Wang et al. | |
| 6,088,017 A | 7/2000 | Tremblay et al. | |

(Continued)

FOREIGN PATENT DOCUMENTS

| | | |
|---|---|---|
| JP | 2500283 B2 | 5/1996 |
| JP | H11-508382 A | 7/1999 |

(Continued)

OTHER PUBLICATIONS

Mar. 10, 2015 International Search Report issued in International Patent Application No. PCT/JP2015/053073.

*Primary Examiner* — Gerald Johnson
(74) *Attorney, Agent, or Firm* — Oliff PLC

(57) ABSTRACT

In a portable type information input and output apparatus having a portable housing, the control unit performs a control to determine whether a detected output by a first sensor (light sensor or atmospheric pressure sensor) for detecting a first environmental change in three-dimensional space exceeds a threshold value or not, and to execute command by regarding all or part of information obtained by a second sensor (acceleration sensor, angular velocity sensor, direction sensor, atmospheric pressure sensor or temperature sensor) for detecting a second environmental change in the three-dimensional space as an input information, and to generate an output signal according to the second environmental change in the three-dimensional space based on the input information, and to output the generated output signal as a vibration information from an information output device composed of at least one vibration device.

8 Claims, 13 Drawing Sheets

(51) Int. Cl.
*G06F 3/03* (2006.01)
*G06F 3/038* (2013.01)

(52) U.S. Cl.
CPC .......... *G06F 3/0304* (2013.01); *G06F 3/0383* (2013.01); *G06F 2203/0331* (2013.01); *G06F 2203/0381* (2013.01)

(56) References Cited

U.S. PATENT DOCUMENTS

| | | |
|---|---|---|
| 2013/0027294 A1 | 1/2013 | Nakagawa et al. |
| 2015/0130709 A1* | 5/2015 | Dangi .................. G06F 3/0383 345/156 |

FOREIGN PATENT DOCUMENTS

| | | |
|---|---|---|
| JP | 2001-056743 A | 2/2001 |
| JP | 2001-312356 A | 11/2001 |
| JP | 2010-134955 A | 6/2010 |
| JP | 2013-025664 A | 2/2013 |
| WO | 2013/022712 A2 | 2/2013 |

\* cited by examiner

| Light Input<br>Relative Value Vcd (X, Y, Z) | Vibration Device X Axis<br>Output Value Bcd (X, Y, Z) |
|---|---|
| (0,0,0) | (5,5,5) |
| (1,1,1) | (7,7,7) |
| (2,1,1) | (24,7,7) |
| (1,2,1) | (7,24,7) |
| (1,1,2) | (7,7,24) |
| (2,2,2) | (24,24,24) |
| (3,2,2) | (48,24,24) |
| (2,3,2) | (24,48,24) |
| (2,2,3) | (24,24,48) |

FIG.13

| Atmospheric Pressure Input<br>Relative Value Vps (X, Y, Z) | Vibration Device X Axis<br>Output Value Bps (X, Y, Z) |
|---|---|
| (0,0,0) | (1,1,1) |
| (1,1,1) | (2,2,2) |
| (2,1,1) | (4,2,2) |
| (1,2,1) | (2,4,2) |
| (1,1,2) | (2,2,4) |
| (2,2,2) | (4,4,4) |
| (3,2,2) | (8,4,4) |
| (2,3,2) | (4,8,4) |
| (2,2,3) | (4,4,8) |

FIG.14

INFORMATION INPUT AND OUTPUT APPARATUS AND INFORMATION INPUT AND OUTPUT METHOD

BACKGROUND OF THE INVENTION

Field of the Invention

The present invention relates to an information input and output apparatus and an information input and output method for performing input and output of information on a space in wearable or mobile computer environment. This application is based upon and claims the benefit of priority from the Japanese Patent Application No. 2014-049701 filed in Japan on Mar. 13, 2014.

Description of Related Art

In the past, an information input and output apparatus in a portable type personal computer has been performing input corresponding to a mouse by touching a display supported by one hand with a finger of the other hand or a pen grasped by the other hand, such as pen input to a compact LCD or a touch panel. However, with these contact type information input apparatus, an environment for input is necessary, such as both hands will be occupied for input, or it should be put in and take out from a bag for input, so there was a problem that it lacks convenience.

In recent years, mobile computing has been progressed, and while a wearable computer is advancing to a stage of practical use, an information input and output apparatus as a human interface capable of performing intuitive operation and possible to use freely at any time and at any place without restraint to a user is desired.

For example, a technology using an equipment (three-dimensional mouse) for performing an operation with a button by moving a cursor pointer on an image display device by moving a portable equipment in three-dimensional space (for example, refer to Patent Literature 1) is proposed.

Also, a technology of virtual keyboard capable of inputting information by sensing movements of fingers by wearing data glove on user's hand, without requiring an actual keyboard (for example, refer to Patent Literature 2), or a technology for recognizing an input information by an image recognition of movements of fingers of opened palm or movement of the other hand pointing to the palm (for example, refer to Patent Literature 3) are proposed.

Patent Literature 1: JP 2001-56743 A
Patent Literature 2: JP 2500283 B
Patent Literature 3: JP 2001-312356 A

SUMMARY OF THE INVENTION

However, in a portable type information input and output apparatus in the past, it was difficult to perform an appropriate operation unless a user confirms the mounted equipment visually.

Also, when the portable type information input and output apparatus is downsized, it will be difficult to add a display device, and even if it was possible to add the display device, a display size has to be extremely small, so it will be difficult to visually recognize.

Further, the portable type information input and output apparatus could be mounted to various parts of body of the user, so there could be a circumstance that it will be difficult to see a display device easily even if the display device is added, depending on the mounted position.

Also, it is possible to add an audio output device to the portable type information input and output apparatus instead of the display device, but the portable type information input and output apparatus could be mounted to various parts of body of the user, so there could be a circumstance that it will be difficult to hear the audio output of the audio output device easily, depending on the mounted position.

Also, in a portable type information input and output apparatus in the past, it could be considered to use it combined with a virtual reality system, but there was a problem that it is not possible to produce contact sensation such as size, roughness, and rigidity of a virtual object wirelessly, even if the display device or the audio output device are added.

Here, considering the above technical problems in the past, the purpose of the present invention is to provide an information input and output apparatus and an information input and output method capable of performing input and output of information easily and surely on a space in wearable or mobile computer environment.

Further, the other purpose of the present invention and the concrete advantage obtained by the present invention will be more obvious from the embodiments explained in the following description by referring to the drawings.

In the present invention, it determines whether to be an information input state or not by whether a detected output of a first environmental change in three-dimensional space exceeds a threshold value or not, and it detects a second environmental change in the three-dimensional space as an input information, when the detected output of the first environmental change exceeds the threshold value, and it outputs a vibration information according to the second environmental change in the three-dimensional space.

In other words, the present invention is a portable type information input and output apparatus comprising a portable housing, the portable type information input and output apparatus comprises in the housing: a first sensor for detecting a first environmental change in three-dimensional space; a second sensor for detecting a second environmental change in the three-dimensional space; an information output means composed of at least one vibration device; and a control means for performing a control to determine whether a detected output obtained by the first sensor exceeds a threshold value or not, and to obtain the second environmental change detected by the second sensor as an input information, when the detected output obtained by the first sensor exceeds the threshold value, and to generate an output signal according to the second environmental change in the three-dimensional space based on the obtained input information, and to output the generated output signal as a vibration information from an information output means.

In the portable type information input and output apparatus relating to the present invention, it can be configured that the first sensor is a light sensor for detecting the first environmental change in the three-dimensional space as a change of light income, and that the control means determines whether to be an information input state or not based on the first environmental change detected as the change of light income in the three-dimensional space by the light sensor, and obtains the second environmental change detected by the second sensor as the input information.

Also, in the portable type information input and output apparatus relating to the present invention, it can be configured that the first sensor is a pressure sensor for detecting the first environmental change in the three-dimensional space as a change of atmospheric pressure, and that the control means determines whether to be an information input state or not based on the first environmental change detected as the change of atmospheric pressure in the three-dimensional space by the pressure sensor, and obtains the second environmental change detected by the second sensor as the input information.

Also, in the portable type information input and output apparatus relating to the present invention, it can be configured that the control means converts absolute value data obtained as the detected output by the first sensor to a relative amount and determines whether the relative amount exceeds the threshold value or not.

Also, in the portable type information input and output apparatus relating to the present invention, it can be configured that the second sensor is a three-dimensional sensor for detecting one or more changes of position, posture, and direction in the three-dimensional space as the second environmental change in the three-dimensional space, and that the control means performs a control to obtain the second environmental change detected as one or more changes of position, posture, and direction in the three-dimensional space by the second sensor as the input information, when the detected output obtained by the first sensor exceeds the threshold value, and to output the output signal according to one or more changes of position, posture, and direction in the three-dimensional space as the vibration information from the information output means.

Also, in the portable type information input and output apparatus relating to the present invention, it can be configured that the information output means is composed of a plurality of vibration devices disposed in three dimensions, and that the control means performs a control to obtain the second environmental change detected by the second sensor as the input information, when the detected output obtained by the first sensor exceeds the threshold value, and to output the output signal according to one or more changes of position, posture, and direction in the three-dimensional space as a three-dimensional vibration information from the information output means.

Also, in the portable type information input and output apparatus relating to the present invention, it can be configured that the three dimensional sensor comprises one kind or plural kinds of sensors of acceleration sensor, angular velocity sensor, and direction sensor.

Further, in the portable type information input and output apparatus relating to the present invention, it can be configured that the housing is removably mounted to a mounting part of a ring type holder, and the housing is mounted to a finger via the ring type holder.

Also, the present invention is an information input and output method by a portable type information input and output device comprising a portable housing, the method comprises: determining whether a detected output by a first sensor for detecting a first environmental change in three-dimensional space exceeds a threshold value or not; obtaining a second environmental change in the three-dimensional space detected by a second sensor as an input information, when the detected output obtained by the first sensor exceeds the threshold value; generating an output signal according to the second environmental change in the three-dimensional space based on the obtained input information, and outputting the generated output signal as a vibration information from an information output means composed of at least one vibration device.

In the present invention, it is possible to perform input and output of information easily and surely on the space in wearable or mobile computer environment by determining whether to be the information input state or not by whether the detected output of the first environmental change in the three-dimensional space exceeds the threshold value or not, and by detecting the second environmental change in the three-dimensional space as the input information when the detected output of the first environmental change exceeds the threshold value, and by outputting the vibration information according to the second environmental change in the three-dimensional space.

BRIEF DESCRIPTION OF THE DRAWINGS

FIG. 4A is illustrating a state that the ring type holder and the housing are separated, and FIG. 4B is illustrating a state that the housing is mounted to the ring type holder.

FIG. 13 is a diagram illustrating an example of a content of a correspondence table between an output value of a vibration device and a three-dimensional space value by a light sensor input used in the information input and output control of the information presentation mode.

FIG. 14 is a diagram illustrating an example of a content of a correspondence table between an output value of a vibration device and a three-dimensional space value by an atmospheric pressure sensor input used in the information input and output control of the information presentation mode.

DETAILED DESCRIPTION OF THE INVENTION

In below, the embodiments of an information input and output apparatus and an information input and output method relating to the present invention are explained in detail with reference to the drawings.

Figure 1:
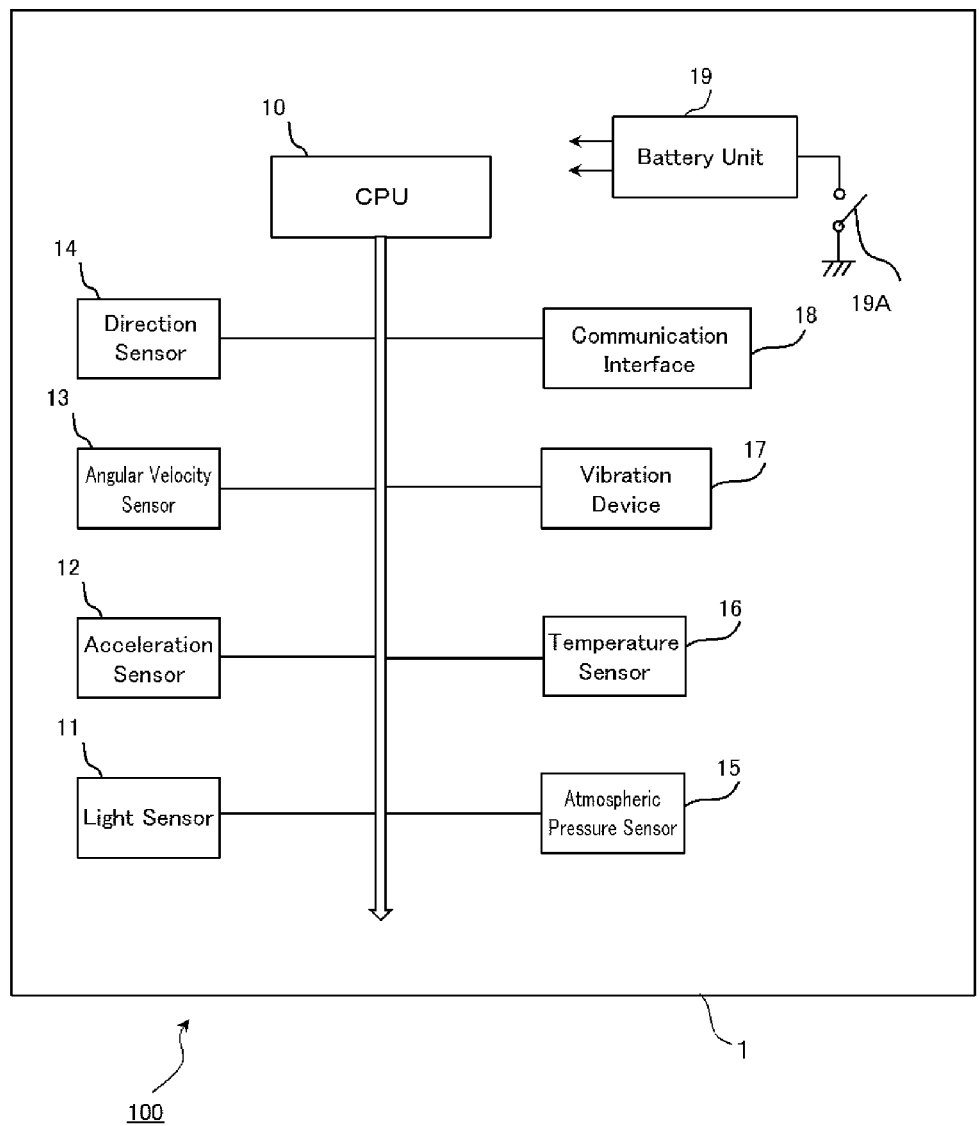
FIG. 1 is a block diagram illustrating the configuration of the information input and output apparatus applying the present invention.

The present invention is applied, for example to an information input and output apparatus 100 with configuration as illustrated in a block diagram of FIG. 1.

This information input and output apparatus 100 is an apparatus for preforming input and output of information on a space in wearable or mobile computer environment, wherein it comprises a portable housing 1, and also, it comprises in the housing 1: a control unit 10 composed of CPU; a light sensor 11 connected to this control unit 10; an acceleration sensor 12; an angular velocity sensor 13; a direction sensor 14; an atmospheric pressure sensor 15; a temperature sensor 16; a vibration device 17; a communication interface 18; a battery unit 19 for supplying power source; and else.

The light sensor 11 is an environmental sensor for detecting an environmental change in three-dimensional space for preforming input and output of information by this information input and output apparatus 100 as a change of light income in a used state of the information input and output apparatus 100, and it supplies a detected output signal indicating the light income in the three-dimensional space to the control unit 10.

Also, the acceleration sensor 12 is an environmental sensor for detecting an environmental change in the three-dimensional space as a change of acceleration in the used state of the information input and output apparatus 100, and it supplies a detected output signal of signal level according to the acceleration in the three-dimensional space to the control unit 10.

Also, the angular velocity sensor 13 is an environmental sensor for detecting an environmental change in the three-dimensional space as a change of angular velocity in the used state of the information input and output apparatus 100, and it supplies a detected output signal indicating the angular velocity in the three-dimensional space to the control unit 10.

Also, the direction sensor 14 is an environmental sensor for detecting an environmental change in the three-dimensional space as a change of direction in the used state of the information input and output apparatus 100, and it supplies a detected output signal indicating the direction in the three-dimensional space to the control unit 10. A geomagnetic sensor is used for this direction sensor 14.

Also, the atmospheric pressure sensor 15 is an environmental sensor for detecting an environmental change in the three-dimensional space as a change of atmospheric pressure in the used state of the information input and output apparatus 100, and it supplies a detected output signal indicating the atmospheric pressure in the three-dimensional space to the control unit 10.

Further, the temperature sensor 16 is an environmental sensor for detecting an environmental change in the three-dimensional space as a change of temperature in the used state of the information input and output apparatus 100, and it supplies a detected output signal indicating the temperature in the three-dimensional space to the control unit 10.

Also, the vibration device 17 is controlled by the control unit 10 and it outputs an output signal generated based on an input information obtained based on an environmental change in three-dimensional space for performing input and output of information by the information input and output apparatus 100 as a vibration information.

Further, the communication interface 18 is provided for transmitting and receiving information between the control unit 10 and external electronic equipment. The communication method is not especially limited, but for example, a wireless communication standard of Bluetooth (Registered Trademark), Wi-Fi (Registered Trademark), ZigBee (Registered Trademark) and else can be used.

And, this information input and output apparatus 100 operates by a power source supplied from the battery unit 19, and generates output signal according to environmental change in the three-dimensional space by the control unit 10 based on the input information obtained as the detected output according to environmental change in the three-dimensional space for performing input and output of information by the information input and output apparatus 100 with the light sensor 11, the acceleration sensor 12, the angular velocity sensor 13, the direction sensor 14, the atmospheric pressure sensor 15, and the temperature sensor 16, and outputs the generated output signal as the vibration information from the vibration device 17. In addition, the power supply from the battery unit 19 can be switched on and off by the operation of switch 19A.

Figure 2:
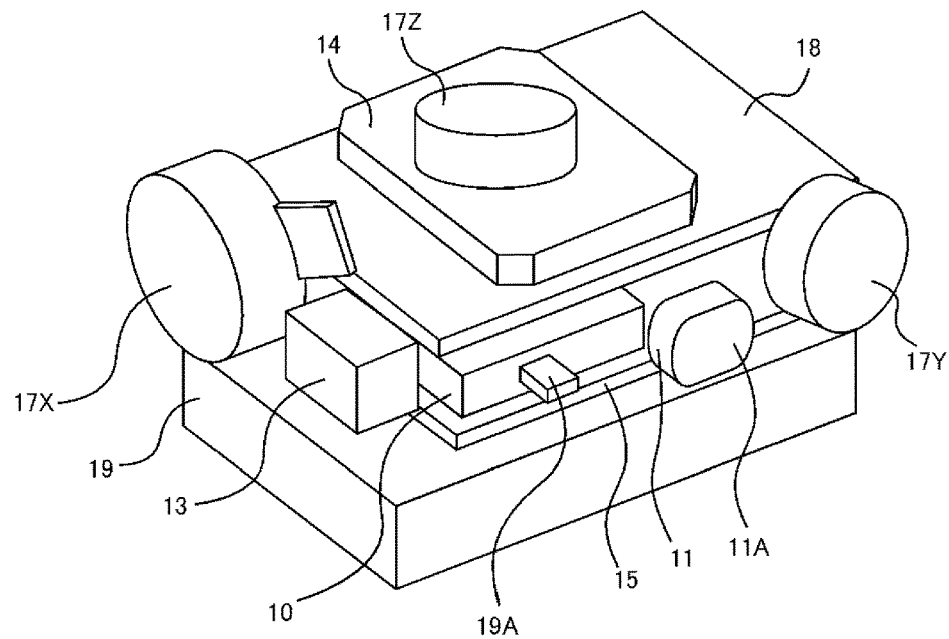
FIG. 2 is a perspective view of external appearance illustrating internal structure of the information input and output apparatus.
Figure 3:
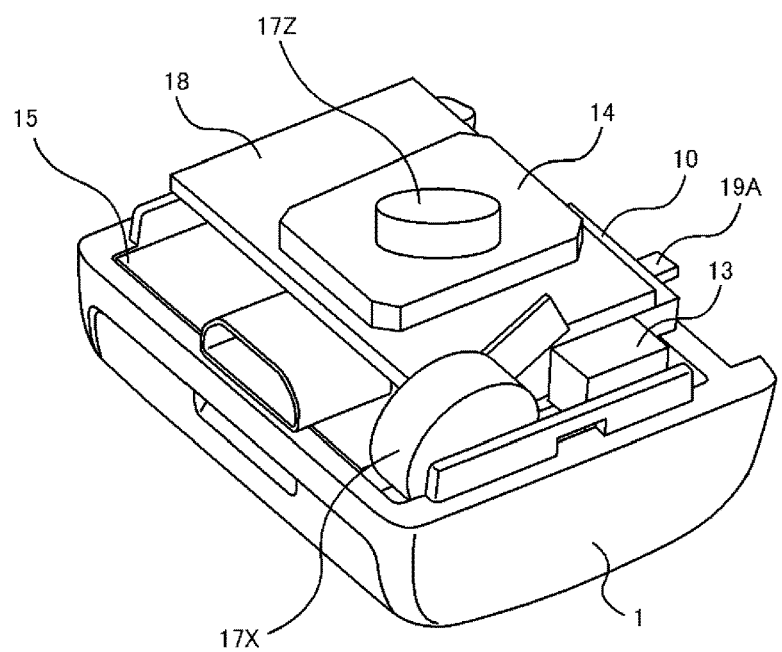
FIG. 3 is a perspective view of external appearance of the information input and output apparatus in the state that the upper half of the housing is removed.

Here, in this information input and output apparatus 100, the control unit 10, the light sensor 11, the acceleration sensor 12, the angular velocity sensor 13, the direction sensor 14, the atmospheric pressure sensor 15, the temperature sensor 16, the vibration device 17, the communication interface 18 and else are laminatingly installed on the battery unit 19, as illustrated in perspective view of external appearance of FIG. 2, and incorporated in the housing 1, as illustrated in perspective view of external appearance of the information input and output apparatus 100 in the state that the upper half of the housing 1 is removed of FIG. 3.

Figure 4A:
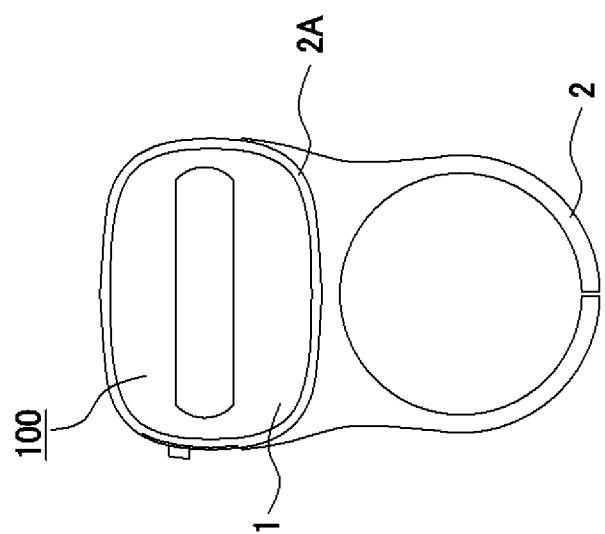
FIG. 4A and 4B are diagrams indicating a ring type holder to which a housing of the information input and output apparatus is mounted.
Figure 4B:
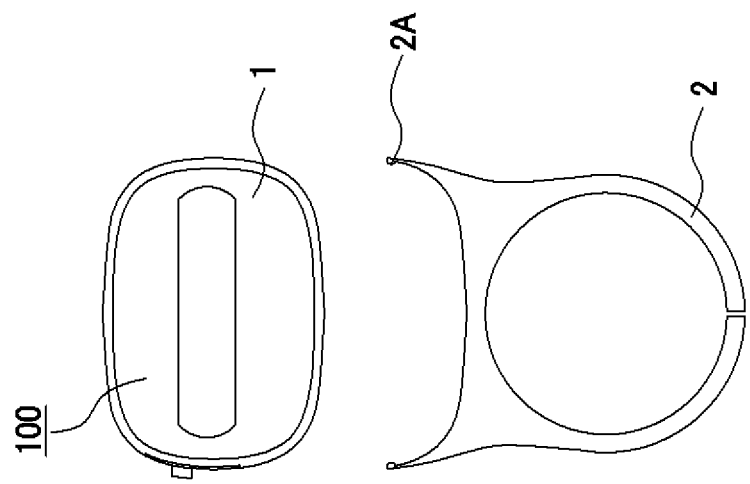

And, the housing 1 can be removably mounted to a mounting part 2A of the ring type holder 2, as illustrated in FIGS. 4A and 4B. Here, FIGS. 4A and 4B are diagrams illustrating the ring type holder to which the housing of the information input and output apparatus is mounted, and FIG. 4A illustrates the state that the ring type holder and the housing are separated, and FIG. 4B illustrates the state that the housing is mounted to the ring type holder.

Figure 5:
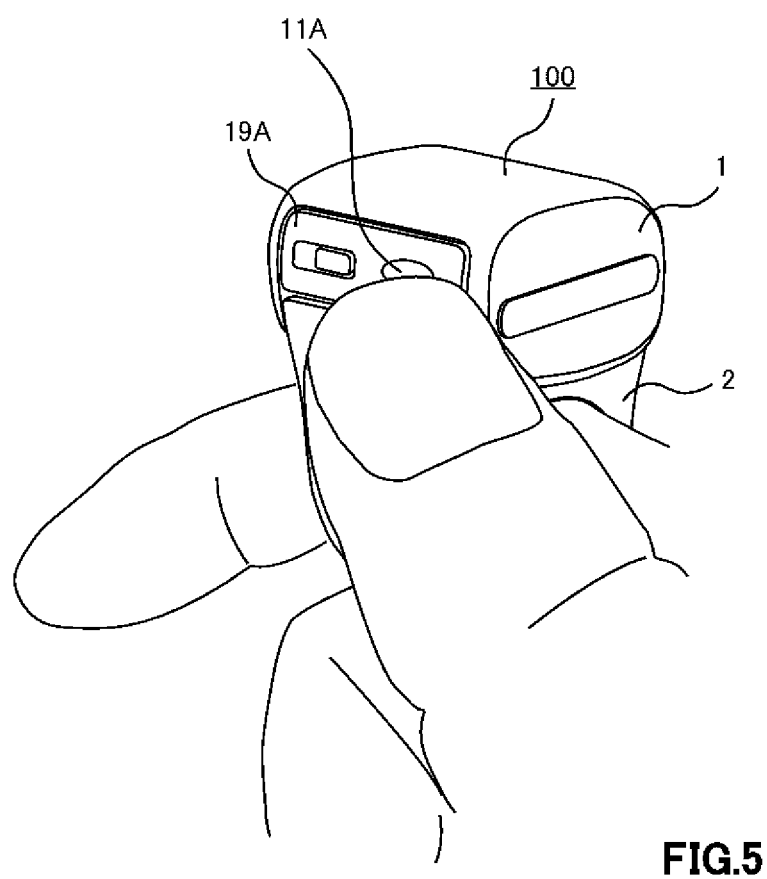
FIG. 5 is a perspective view of external appearance illustrating a used state of the information input and output apparatus.

This information input and output apparatus 100 is used by mounted for example to a forefinger of a user via the ring type holder 2, as illustrated in FIG. 5.

Figure 6:
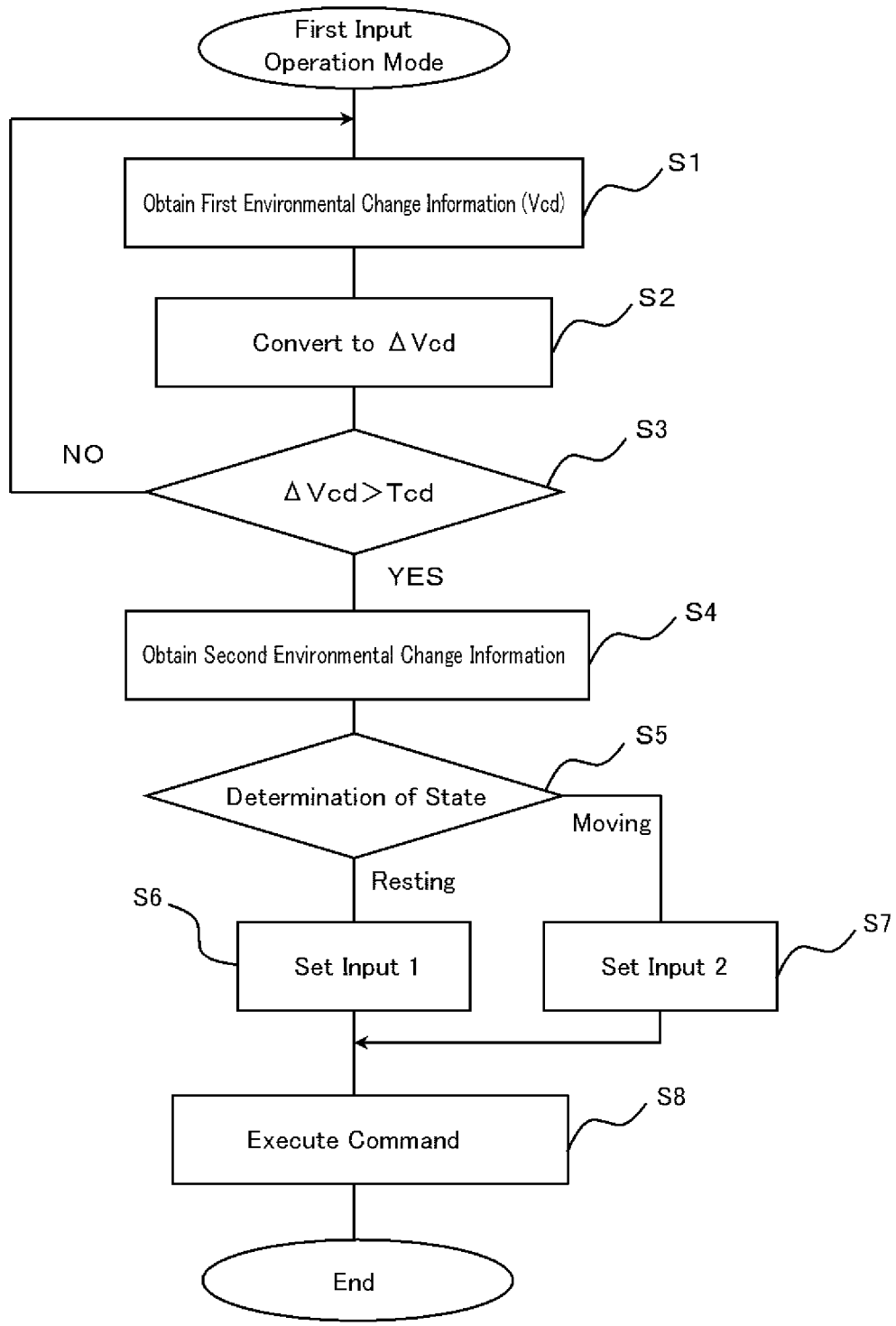
FIG. 6 is a flow chart illustrating an order of information input and output control of a first input operation mode by a control unit in the information input and output apparatus.

And, the control unit 10 in this information input and output apparatus 100 performs information input and output control of first input operation mode, for example according to the order illustrated in flow chart of FIG. 6.

In the first input operation mode, the control unit 10 performs non-contact information output control by the light sensor 11.

In other words, at first in step S1, the control unit 10 performs processing to obtain light input absolute value (Vcd) data, i.e. detected output signal indicating light income in three-dimensional space of the information input and output apparatus 100 detected by the light sensor 11, as a first environmental change information in three-dimensional space for performing input and output of information by this information input and output apparatus 100.

In next step S2, the control unit 10 performs processing to convert the light input absolute value (Vcd) data, i.e. the first environmental change information obtained by the processing of the step S1, to light input relative amount ($\Delta$ Vcd) by following conversion formula (formula 1).

$$\Delta Vcd = \Sigma(Vcd_{t=n} - Vcd_{t=n-1})/n \quad \text{(formula 1)}$$

However, t is a unit time, and n is a measured natural number of light input absolute value.

In next step S3, the control unit 10 performs processing to determine whether or not the light input relative amount ($\Delta$ Vcd) obtained by the processing of the step S2 exceeds a threshold value Tcd for determining whether to be the information input state or not.

In next step S4, the control unit 10 performs processing to simultaneously obtain an acceleration information indicated by the detected output signal by the acceleration sensor 12, an angular velocity information indicated by the detected output signal by the angular velocity sensor 13, a direction information indicated by the detected output signal by the direction sensor 14, an atmospheric pressure information indicated by the detected output signal by the atmospheric pressure sensor 15, and a temperature information indicated by the detected output signal by the temperature sensor 16, as a second environmental change information in the three-dimensional space, when the light input relative amount ($\Delta$ Vcd) exceeds the threshold value Tcd, i.e. when the determination result in the step S3 is "YES". In addition, when the light input relative amount ($\Delta$ Vcd) does not exceed the threshold value Tcd, i.e. when the determination result in the step S3 is "NO", it goes back to the processing of the step S1 and repeats the processing to obtain the light input absolute value (Vcd) data indicated by the detected output signal by the light sensor 11.

In next step S5, the control unit 10 determines that this information input and output apparatus 100 is in what kind of state in the three-dimensional space from the second environmental change information obtained by the processing of the step S4, i.e. from all or part of the acceleration information, the angular velocity information, the direction information, the atmospheric pressure information, and the temperature information.

Figure 7:
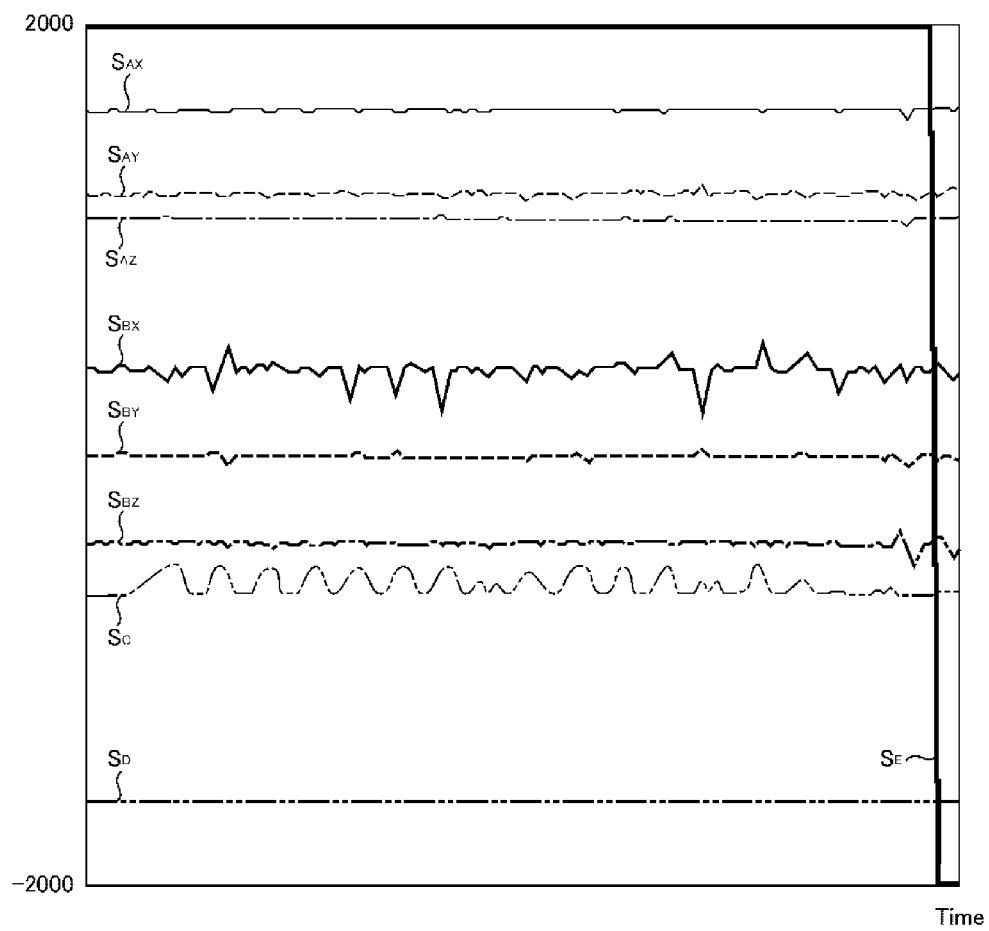
FIG. 7 is a diagram illustrating an example of detected output signals of each sensor used for information input and output control of the first input operation mode.

And as a result of the determination in the step S5, for example as the detected output signals of each sensor illustrated in FIG. 7, when the light input relative amount ($\Delta$ Vcd) obtained by the processing of the step S2 exceeds the threshold value Tcd, and when this information input and output apparatus 100 is not moving in the three-dimensional space, in next step S6, the control unit 10 sets a three-dimensional space value Vcd (0, 0, 0) from the acceleration information, the angular velocity information, and the direction information, and sets input information to [Input 1].

In other words, in FIG. 7, $S_{AX}$ is an acceleration detection signal of X axis, $S_{AY}$ is an acceleration detection signal of Y axis, $S_{AZ}$ is an acceleration detection signal of Z axis, $S_{BX}$ is an angular velocity detection signal of X axis, $S_{BY}$ is an angular velocity detection signal of Y axis, $S_{BZ}$ is an angular velocity detection signal of Z axis, $S_C$ is a light amount detection signal, $S_D$ is an atmospheric pressure detection signal, and $S_E$ is a temperature detection signal. And, the acceleration detection signals $S_{AX}$, $S_{AY}$, $S_{AZ}$ do not fluctuate mostly, so it illustrates that the movement of the information input and output apparatus 100 in the three-dimensional space is not occurring mostly, but the light amount detection signal $S_C$ is fluctuating as illustrated in FIG. 7, so it is determined that there is an input instruction, and it sets three-dimensional space value Vcd (X, Y, Z) by the light sensor 11 to Vcd (0, 0, 0), and sets input information to [Input 1].

Figure 8:
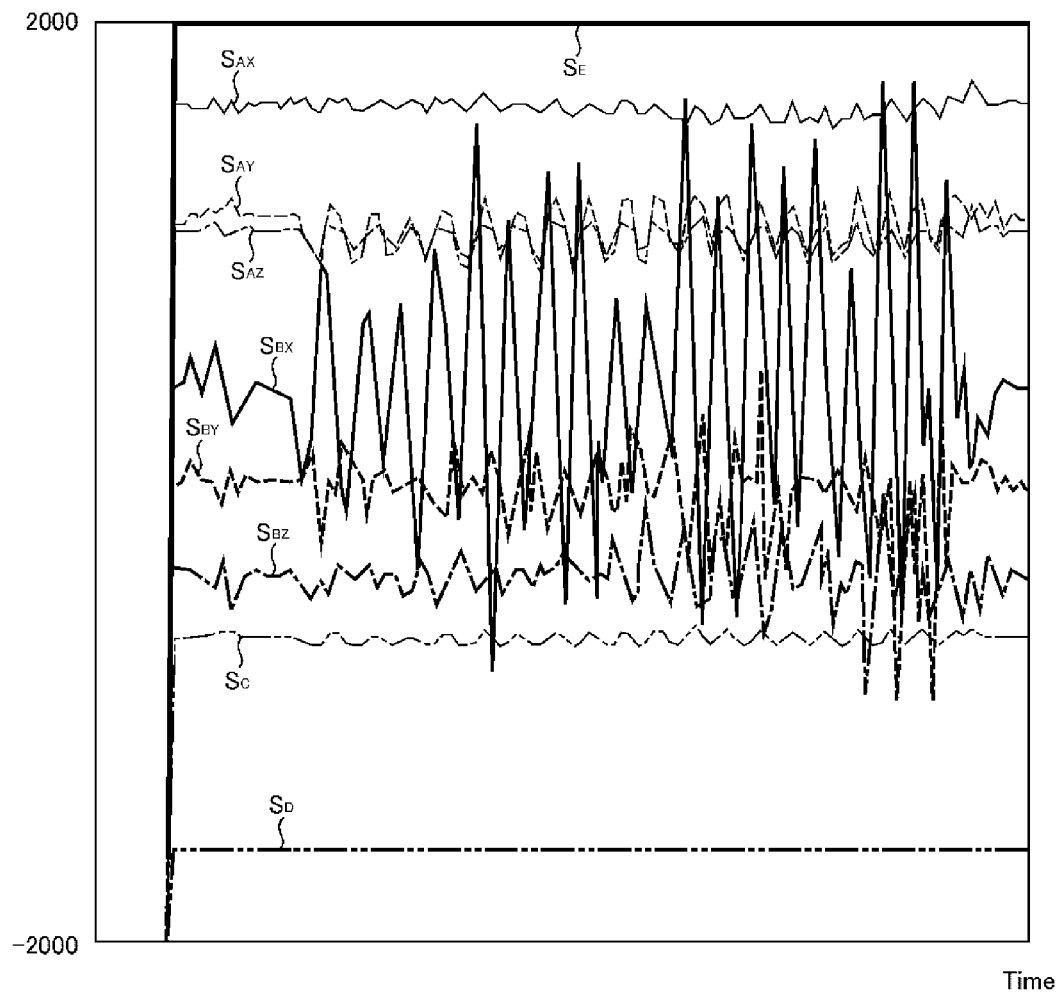
FIG. 8 is a diagram illustrating the other example of detected output signals of each sensor used for information input and output control of the first input operation mode.

Also, as a result of determination in the step S5, for example as the detected output signals of each sensor illustrated in FIG. 8, when the light input relative amount ($\Delta$ Vcd) obtained by the processing of the step S2 exceeds the threshold value Tcd, and when this information input and output apparatus 100 is moving in the three-dimensional space, in next step S7, the control unit 10 sets three-dimensional space value Vcd (X, Y, Z) as operator from the acceleration information, the angular velocity information, and the direction information, and sets input information to [Input 2].

In other words, in FIG. 8, $S_{AX}$ is an acceleration detection signal of X axis, $S_{AY}$ is an acceleration detection signal of Y axis, $S_{AZ}$ is an acceleration detection signal of Z axis, $S_{BX}$ is an angular velocity detection signal of X axis, $S_{BY}$ is an angular velocity detection signal of Y axis, $S_{BZ}$ is an angular velocity detection signal of Z axis, $S_C$ is a light amount detection signal, $S_D$ is an atmospheric pressure detection signal, and $S_E$ is a temperature detection signal. And, the acceleration detection signals $S_{AX}$, $S_{AY}$, $S_{AZ}$ and the angular velocity detection signals $S_{BX}$, $S_{BY}$, $S_{BZ}$ are fluctuating largely, so it illustrates that the movement of the information input and output apparatus 100 in the three-dimensional space is occurring, and the light amount detection signal $S_C$ is fluctuating as illustrated in FIG. 8, so it is determined that there is an input instruction, and it sets three-dimensional space value Vcd (X, Y, Z) by the light sensor 11 to Vcd (X1, Y1, Z1), and sets input information to [Input 2].

Further, in next step S8, the control unit 10 executes the command by setting the input information [Input 1] as a resting state command and by setting the input information [Input 2] as a moving state command. In other words, it is determined that the input information [Input 1] is a light sensor input instruction when the information input and output apparatus 100 is not moving in the three-dimensional space, and performs light sensor input processing corresponding to when there is no three-dimensional space movement. On the other hand, it is determined that the input information [Input 2] is a light sensor input instruction when the information input and output apparatus 100 is moving in the three-dimensional space, and performs light sensor input processing corresponding to when there is three-dimensional space movement.

In other words, in this first input operation mode, the control unit 10 determines whether to perform input and output or not by whether the light input relative amount ($\Delta$ Vcd) converted from the light input absolute value (Vcd) exceeds the threshold value Tcd or not, by using the light input absolute value (Vcd) data indicated by the detected output signal by the light sensor 11 as the first environmental change information for determining whether to perform input and output of information by this information input and output apparatus 100 or not. And, it will not be in the information input state when the light input relative amount ($\Delta$ Vcd) does not exceed the threshold value Tcd, and it determines that there was the input and output instruction when the light input relative amount ($\Delta$ Vcd) exceeds the threshold value Tcd, and sets the second environmental change information, i.e. all or part of the acceleration information indicated by the detected output signal by the acceleration sensor 12, the angular velocity information indicated by the detected output signal by the angular velocity sensor 13, the direction information indicated by the detected output signal by the direction sensor 14, the atmospheric pressure information indicated by the detected output signal by the atmospheric pressure sensor 15, and the temperature information indicated by the detected output signal by the temperature sensor 16, as the input information [Input 1] and [Input 2], and executes the command.

In this information input and output apparatus 100, when it is used by mounting it for example to the forefinger of the user via the ring type holder 2, it is possible to perform input and output instruction by changing the light input absolute value (Vcd), by covering a light reception part 11A of the light sensor 11 with thumb.

Figure 9:
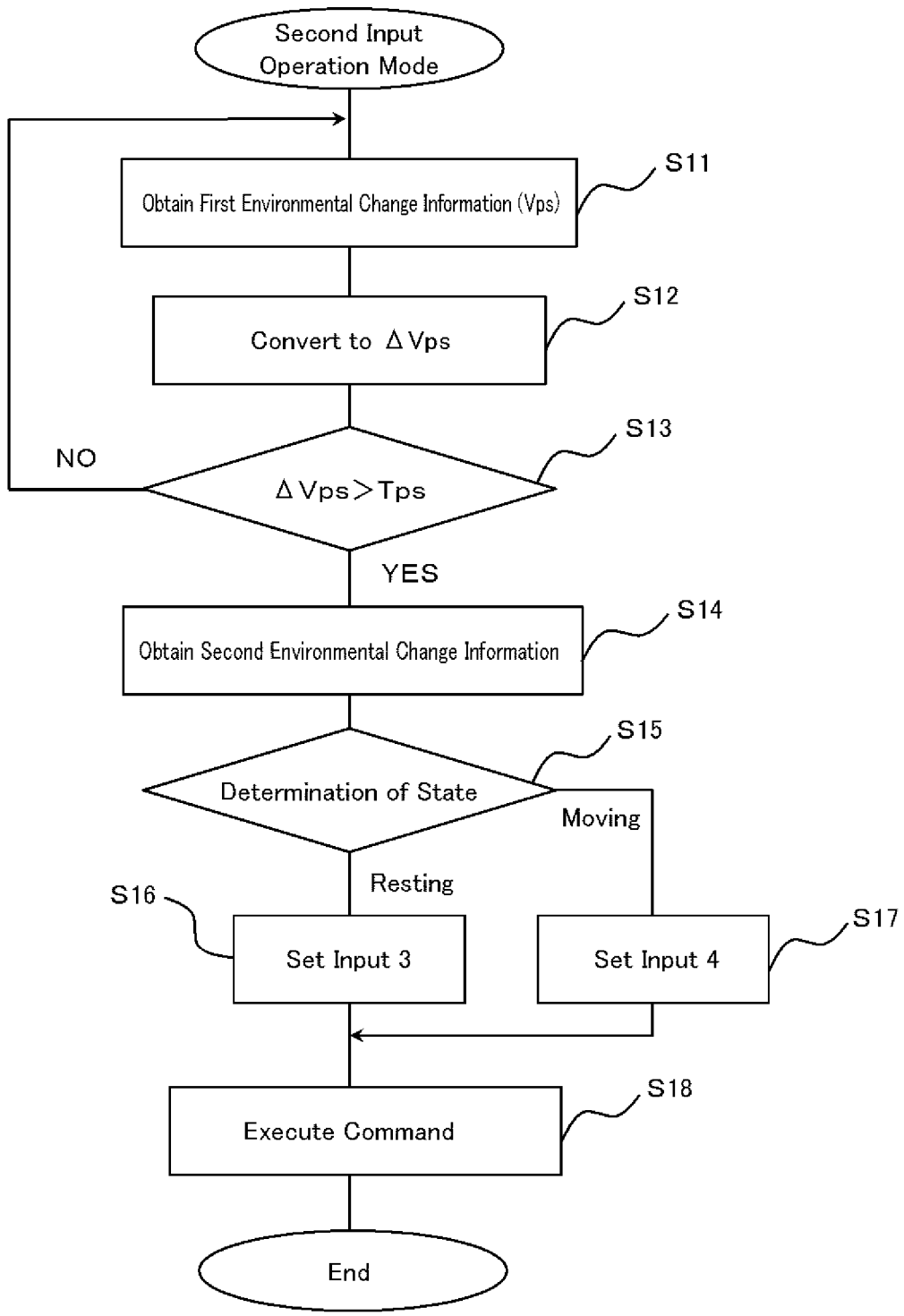
FIG. 9 is a flow chart illustrating an order of information input and output control of a second input operation mode by a control unit in the information input and output apparatus.

Also, the control unit 10 in this information input and output device 100 performs information input and output control of the second input operation mode, for example, according to the order illustrate in flow chart of FIG. 9.

In other words, in the second input operation mode, the control unit 10 performs non-contact information output control by the atmospheric pressure sensor 15.

In other words, at first in step S11, the control unit 10 performs processing to obtain atmospheric pressure input absolute value (Vps) data, i.e. the detected output signal indicating the atmospheric pressure in the three-dimensional space of the information input and output device 100 detected by the atmospheric pressure sensor 15, as the first environmental change information in the three-dimensional space for performing input and output of information by this information input and output apparatus 100.

In next step S12, the control unit 10 performs processing to convert the first environmental change information obtained by the processing of the step S11, i.e. the atmospheric pressure input absolute value (Vps) data into an atmospheric pressure input relative amount ($\Delta$ Vps) by the following conversion formula (formula 2).

$$\Delta Vps = \Sigma (Vps_{t=m} - Vps_{t=m-1})/m \quad \text{(formula 2)}$$

However, t is a unit time, and m is a measured natural number of atmospheric pressure input absolute value.

In next step S13, the control unit 10 performs processing to determine whether or not the atmospheric pressure input relative amount ($\Delta$ Vps) obtained by the processing of the step S12 exceeds a threshold value Tps for deciding whether to be the information input state or not.

In next step S14, the control unit 10 performs processing to simultaneously obtain the acceleration information indicated by the detected output signal by the acceleration sensor 12, the angular velocity information indicated by the detected output signal by the angular velocity sensor 13, the direction information indicated by the detected output signal by the direction sensor 14, the atmospheric pressure information indicated by the detected output signal by the atmospheric pressure sensor 15, and the temperature information indicated by the detected output signal by the temperature sensor 16, as the second environmental change information in the three-dimensional space, when the determination result in the step S13 is "Yes", i.e. when the atmospheric pressure input relative amount ($\Delta$ Vps) exceeds the threshold value Tps. In addition, when the determination result in the step S13 is "NO", i.e. when the atmospheric pressure input relative amount ($\Delta$ Vps) does not exceed the threshold value Tps, it goes back to the processing of the step S11, and repeats the processing to obtain the atmospheric pressure input absolute value (Vps) data indicated by the detected output signal by the atmospheric pressure sensor 15.

In next step S15, the control unit 10 determines that this information input and output apparatus 100 is in what kind of state in the three-dimensional space from all or part of the acceleration information, the angular velocity information, the direction information, the atmospheric pressure information, and the temperature information, i.e. the second environmental change information obtained by the processing of the step S14.

Figure 10:
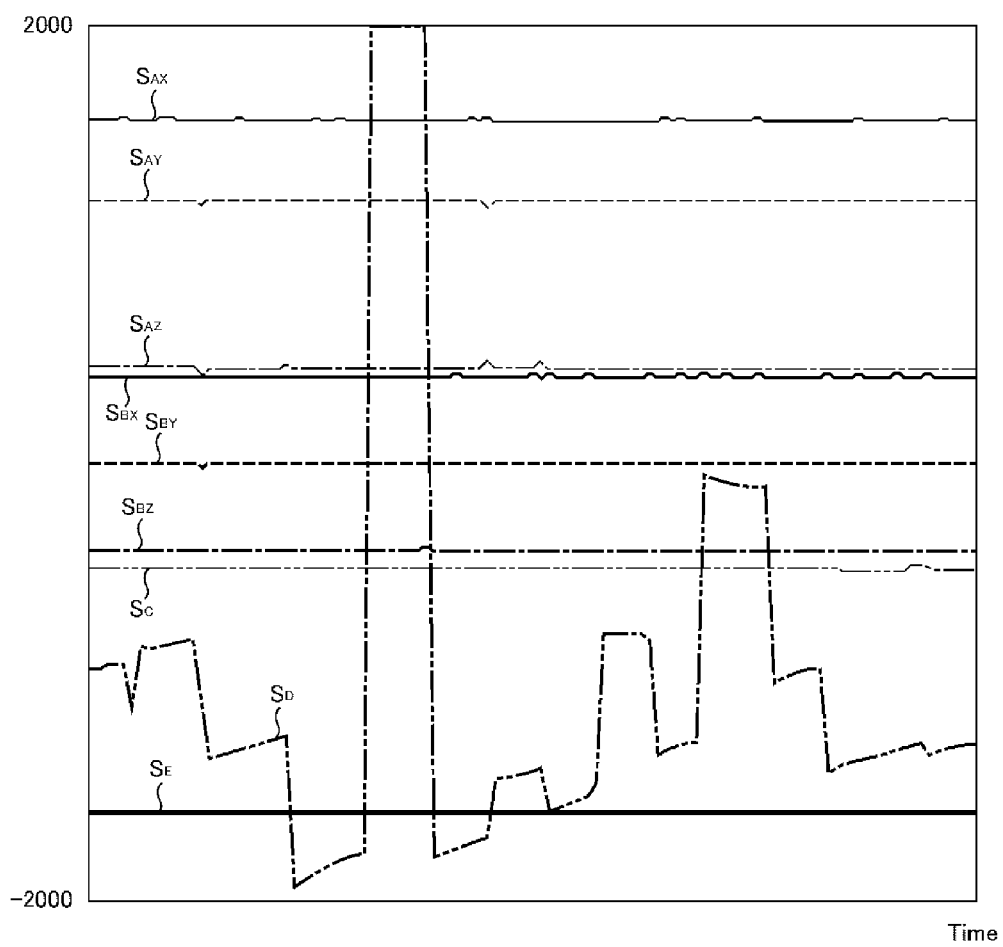
FIG. 10 is a diagram illustrating an example of detected output signals of each sensor used for information input and output control of the second input operation mode.

And, as a result of determination in the step S15, for example as the detected output signals of each sensor are illustrated in FIG. 10, when the atmospheric pressure input relative amount ($\Delta$ Vps) obtained by the step S12 exceeds the threshold value Tps, and when this information input and output apparatus 100 is not moving largely in the three-dimensional space, in next step S16, the control unit 10 sets a three-dimensional space value Vps (0, 0, 0) from the acceleration information, the angular velocity information, and the direction information, and sets input information to [Input 3].

In other words, in FIG. 10, $S_{AX}$ is an acceleration detection signal of X axis, $S_{AY}$ is an acceleration detection signal of Y axis, $S_{AZ}$ is an acceleration detection signal of Z axis, $S_{BX}$ is an angular velocity detection signal of X axis, $S_{BY}$ is an angular velocity detection signal of Y axis, $S_{BZ}$ is an angular velocity detection signal of Z axis, $S_C$ is a light amount detection signal, $S_D$ is an atmospheric pressure detection signal, and $S_E$ is a temperature detection signal. And, the acceleration detection signals $S_{AX}$, $S_{AY}$, $S_{AZ}$ do not fluctuate mostly, so it illustrates that the movement of the information input and output apparatus 100 in the three-dimensional space is not occurring mostly, but the atmospheric pressure detection signal $S_D$ is fluctuating as illustrated in FIG. 10, so it is determined that there is an input instruction, and it sets three-dimensional space value Vps (X, Y, Z) by the atmospheric pressure sensor 15 to Vps (0, 0, 0), and sets input information to [Input 3].

Figure 11:
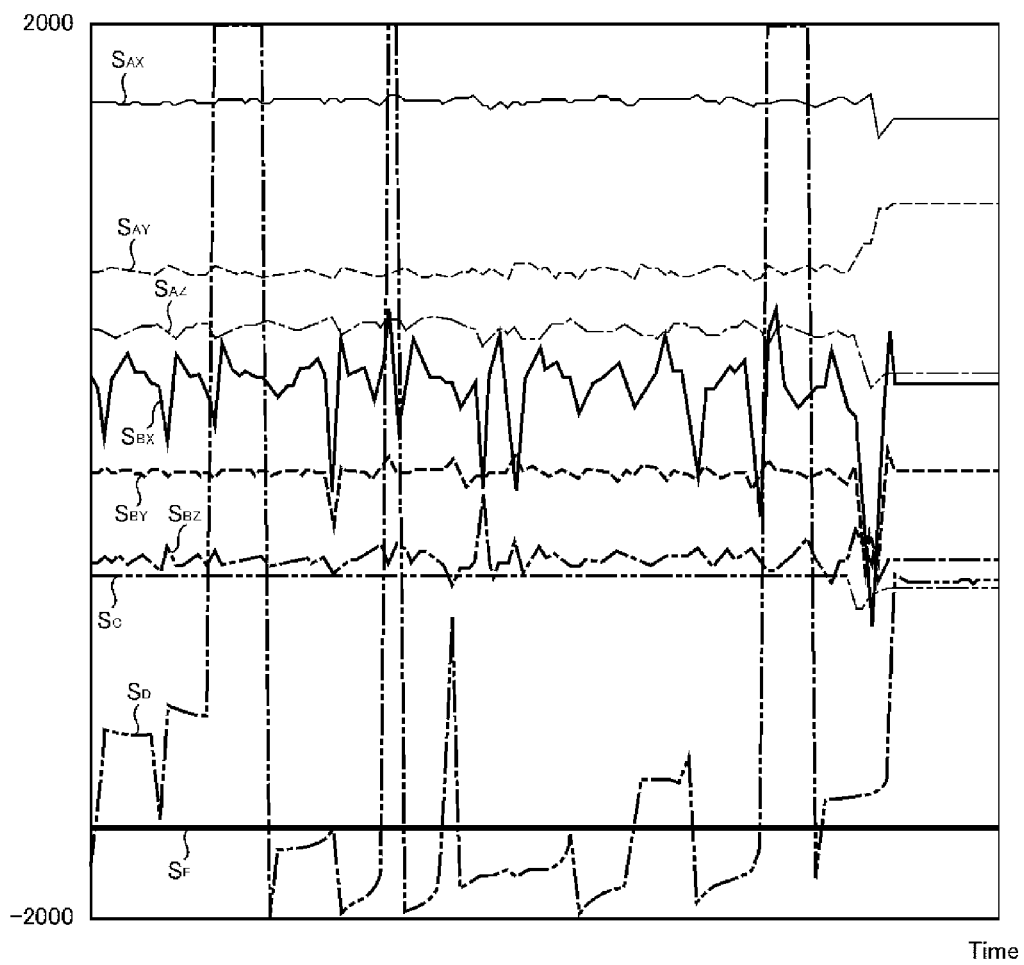
FIG. 11 is a diagram illustrating the other example of detected output signals of each sensor used for information input and output control of the second input operation mode.

Also, as a result of determination in the step S15, for example as the detected output signals of each sensor are illustrated in FIG. 11, when the atmospheric pressure input relative amount ($\Delta$ Vps) obtained by the processing of the step S12 exceeds the threshold value Tps, and when this information input and output apparatus 100 is moving largely in the three-dimensional space, in next step S17, the control unit 10 sets three-dimensional space value Vps (X, Y, Z) as operator from the acceleration information, the angular velocity information, and the direction information, and sets input information to [Input 4].

In other words, in FIG. 11, $S_{AX}$ is an acceleration detection signal of X axis, $S_{AY}$ is an acceleration detection signal of Y axis, $S_{AZ}$ is an acceleration detection signal of Z axis, $S_{BX}$ is an angular velocity detection signal of X axis, $S_{BY}$ is an angular velocity detection signal of Y axis, $S_{BZ}$ is an angular velocity detection signal of Z axis, $S_C$ is a light amount detection signal, $S_D$ is an atmospheric pressure detection signal, and $S_E$ is a temperature detection signal. And, the acceleration detection signals $S_{AX}$, $S_{AY}$, $S_{AZ}$ and the angular velocity detection signals $S_{BX}$, $S_{BY}$, $S_{BZ}$ are fluctuating largely, so it illustrates that the movement of the information input and output apparatus 100 in the three-dimensional space is occurring, and the atmospheric pressure detection signal $S_D$ is fluctuating as illustrated in FIG. 11, so it is determined that there is an input instruction, and it sets three-dimensional space value Vps (X, Y, Z) by the atmospheric pressure sensor 15 to Vps (X2, Y2, Z2), and sets input information to [Input 4].

Further, in next step S18, the control unit 10 executes the command by setting the input information [Input 3] as a resting state command and by setting the input information [Input 4] as a moving state command. In other words, it is determined that the input information [Input 3] is a pressure sensor input instruction when the information input and output apparatus 100 is not moving in the three-dimensional space, and performs pressure sensor input processing corresponding to when there is no three-dimensional space movement. On the other hand, it is determined that the input information [Input 4] is a pressure sensor input instruction when the information input and output apparatus 100 is moving in the three-dimensional space, and performs pressure sensor input processing corresponding to when there is three-dimensional space movement.

In other words, in this second input operation mode, the control unit 10 determines whether to perform input and output or not by whether the atmospheric pressure input relative amount (Δ Vps) converted from the atmospheric pressure input absolute value (Vps) exceeds the threshold value Tps or not, by using the atmospheric pressure input absolute value (Vps) data indicated by the detected output signal by the atmospheric pressure sensor 15 as the first environmental change information for determining whether to perform input and output of information by this information input and output apparatus 100 or not. And, it will not be regarded as the input and output instruction when the atmospheric pressure input relative amount (Δ Vps) does not exceed the threshold value Tps, even if the information input and output apparatus 100 is moved largely in the three-dimensional space, and it determines that there was the input and output instruction when the atmospheric pressure input relative amount (Δ Vps) exceeds the threshold value Tps, and sets the second environmental change information, i.e. all or part of the acceleration information indicated by the detected output signal by the acceleration sensor 12, the angular velocity information indicated by the detected output signal by the angular velocity sensor 13, the direction information indicated by the detected output signal by the direction sensor 14, the atmospheric pressure information indicated by the detected output signal by the atmospheric pressure sensor 15, and the temperature information indicated by the detected output signal by the temperature sensor 16, as the input information [Input 3] and [Input 4], and executes the command.

In this information input and output apparatus 100, when it is used by mounting it for example to the forefinger of the user via the ring type holder 2, it is possible to perform input and output instruction associated with the movement from first floor to second floor or the action such as raising hand or standing up, as the atmospheric pressure input absolute value (Vps) changes by the height position of the information input and output apparatus 100.

In this information input and output apparatus 100, the control unit 10 obtains posture information in the used state of the information input and output apparatus 100 from the detected output signal indicating the angular velocity in the three-dimensional space obtained by the angular velocity sensor 13. In other words, the angular velocity sensor 13 functions as a posture sensor for obtaining the posture information in the used state of the information input and output apparatus 100. Also, the control unit 10 obtains position information in the used state of the information input and output apparatus 100 from the detected output signal indicating the acceleration in the three-dimensional space obtained by the acceleration sensor 12. In other words, the acceleration sensor 12 functions as a position sensor for obtaining the position information in the used state of the information input and output apparatus 100.

Figure 12:
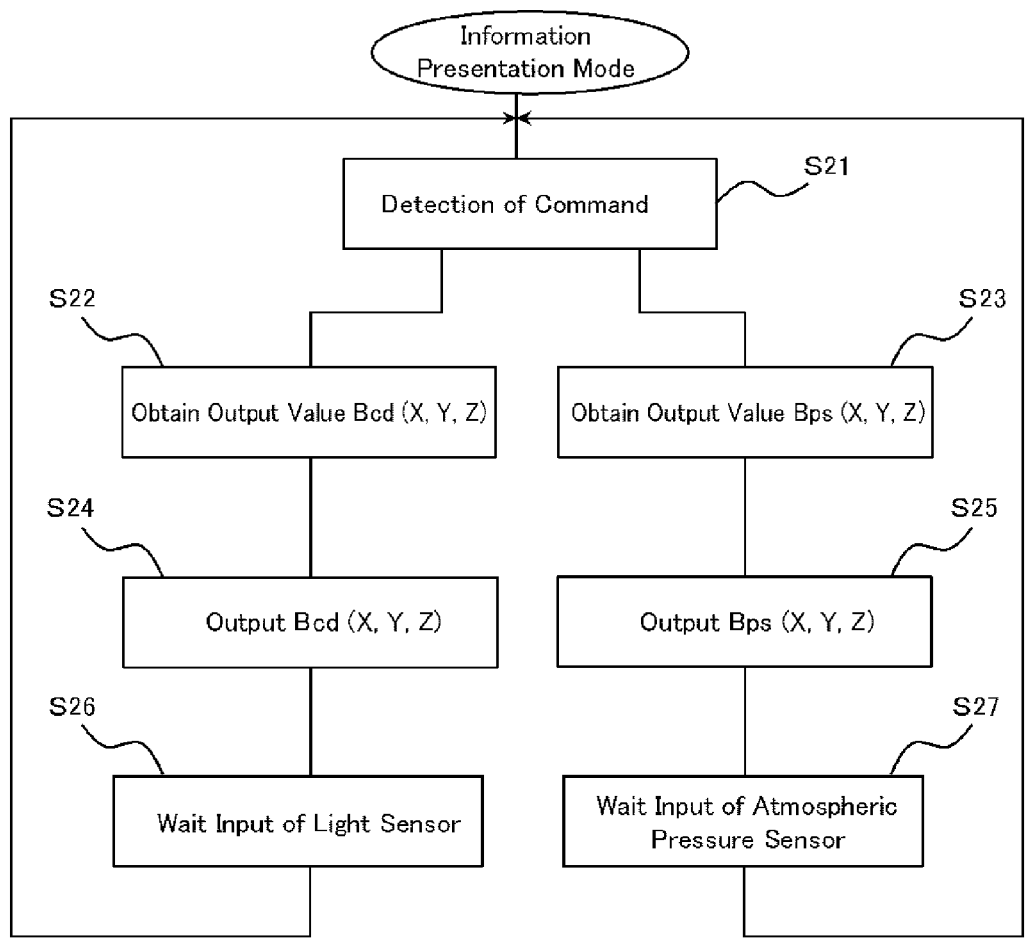
FIG. 12 is a flow chart illustrating an order of information input and output control of an information presentation mode by a control unit in the information input and output apparatus.

Also, in this information input and output apparatus 100, the control unit 10 performs information input and output control of the information presentation mode, for example, according to the order illustrated in flow chart of FIG. 12.

In other words, at first in step S21, the control unit 10 performs processing to detect the command by the input information [Input 1] and [Input 2] based on the detected output of the light sensor 11 executed in the first input operation mode, and by the input information [Input 3] and [Input 4] based on the detected output of the atmospheric pressure sensor 15 executed in the second input operation mode.

In next step S22, the control unit 10 performs processing to obtain output value Bcd (X, Y, Z) of vibration device 17 by referring to the correspondence table between the output value Bcd (X, Y, Z) of the vibration device 17 and three-dimensional space value Vcd (X, Y, Z) by the light sensor input, i.e. light input relative value, for example as illustrated in FIG. 13.

In next step S23, the control unit 10 performs processing to obtain output value Bps (X, Y, Z) of vibration device 17 by referring to the correspondence table between the output value Bps (X, Y, Z) of the vibration device 17 and three-dimensional space value Vps (X, Y, Z) by the atmospheric pressure sensor input, i.e. atmospheric pressure input relative value, for example as illustrated in FIG. 14.

In next step S24, the control unit 10 applies the output value Bcd (X, Y, Z) corresponding to the obtained three-dimensional space value Vcd (X, Y, Z) to the vibration device 17 and vibrates it.

Also, in next step S25, the control unit 10 applies the output value Bps (X, Y, Z) corresponding to the obtained three-dimensional space value Vps (X, Y, Z) to the vibration device 17 and vibrates it.

And, after outputting the output value Bcd (X, Y, Z) in the step S24, in next step S26, the control unit 10 will be in waiting state for next input from the light sensor 11, and when obtaining the three-dimensional space value Vcd (X, Y, Z) by the light sensor input by non-contact information output control by the light sensor 11 of the first input operation mode, it goes back to the step S21, and repeats the control of output processing for vibrating the vibration device 17 according to the correspondence table illustrated in FIG. 13.

Also, after outputting the output value Bps (X, Y, Z) in the step S25, in next step S27, the control unit 10 will be in waiting state for next input from the atmospheric pressure sensor 15, and when obtaining the three-dimensional space value Vps (X, Y, Z) by the atmospheric pressure sensor input by non-contact information output control by the atmospheric pressure sensor 15 of the second input operation mode, it goes back to the step S21, and repeats the control of output processing for vibrating the vibration device 17 according to the correspondence table illustrated in FIG. 14.

In other words, in this embodiment, in the portable information input and output apparatus 100 comprising a portable housing 1, the control unit 10 performs the control to determine whether the detected output by the light sensor 11 or the atmospheric pressure sensor 15, i.e. the first sensor for detecting the first environmental change in the three-dimensional space, exceeds the threshold value or not, and, when the detected output obtained by the first sensor exceeds the threshold value, to execute the command by regarding all or part of the acceleration information indicated by the detected output signal by the acceleration sensor 12, the angular velocity information indicated by the detected output signal by the angular velocity sensor 13, the direction information indicated by the detected output signal by the direction sensor 14, the atmospheric pressure information indicated by the detected output signal by the atmospheric pressure sensor 15, and the temperature information indicated by the detected output signal by the temperature sensor 16, obtained by the second sensor for detecting the second environmental change in the three-dimensional space, as the input information [Input 1], [Input 2], [Input 3], and [Input 4], and to generate the output signal according to the second environmental change in the three-dimensional space based on the input information, and to output the generated output signal as the vibration information from the information output means composed of at least one vibration device 17.

In the information input and output apparatus 100 of such configuration, it is possible to perform input and output of information easily and surely on the space in wearable or mobile computer environment by determining whether to be the information input state or not by whether the detected output of the first environmental change in the three-dimensional space exceeds the threshold value or not, and by detecting the second environmental change in the three-dimensional space as the input information when the detected output of the first environmental change exceeds the threshold value, and by outputting the vibration information according to the second environmental change in the three-dimensional space.

Here, the information input and output apparatus 100 comprises three vibration devices 17X, 17Y, 17Z disposed in three dimensions, as the vibration device 17, such that the vibration surfaces will be orthogonal to three-axis (X axis, Y axis, Z axis) direction of the three-dimensional space, and the control unit 10 performs the control to determine whether to be the information input state or not by whether the detected output of the first environmental change in the three-dimensional space exceeds the threshold value or not, and to detect the second environmental change in the three-dimensional space as the input information when the detected output of the first environmental change exceeds the threshold value, and to output a three-dimensional vibration information according to the second environmental change in the three-dimensional space from the three vibration devices 17X, 17Y, 17Z disposed in three dimensions. In other words, the control unit 10 outputs the three-dimensional vibration information from the three vibration devices 17X, 17Y, 17Z disposed in three dimensions, according to the command by the input information [Input 1] and [Input 2] based on the detected output of the light sensor 11 executed in the first input operation mode, and by the input information [Input 3] and [Input 4] based on the detected output of the atmospheric pressure sensor 15 executed in the second input operation mode.

Figure 15:
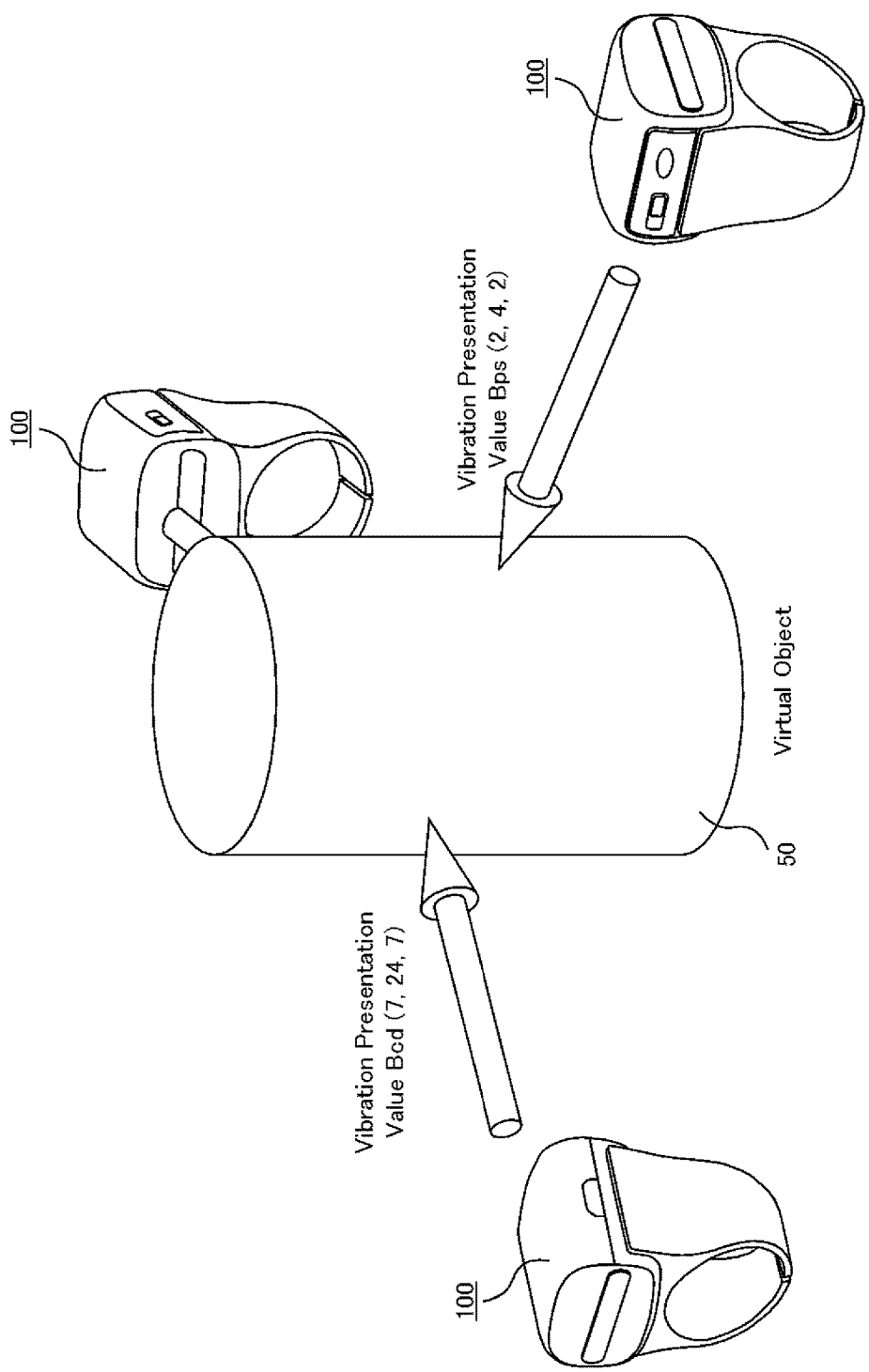
FIG. 15 is a schematic view of an example of input and output of information in three-dimensional space associated with a virtual reality system.

And, the control unit 10 in this portable information input and output apparatus 100 comprises the function to exchange information with the portable terminal and else via the communication interface 18, and it functions as the input and output apparatus associated with the external virtual reality system, for example as indicated in the example of input and output of information in the three-dimensional space in FIG. 15, by obtaining the correspondence table between the three-dimensional space value Vcd (X, Y, Z) by the light sensor input and the output value Bcd (X, Y, Z) of the vibration device 17, and by obtaining the correspondence table between the three-dimensional space value Vps (X, Y, Z) by the atmospheric pressure sensor input and the output value Bps (X, Y, Z) of the vibration device 17 and storing them in the memory, and by transmitting the input information [Input 1], [Input 2], [Input 3], and [Input 4] to the portable terminal and else, and it is capable of presenting the contact sensation such as size, roughness, and rigidity of the virtual object 50 wirelessly.

In addition, it is described that the portable information input and output apparatus 100 can be mounted to the finger of the user via the ring type holder 2, but it can be mounted to the body of the user via the holder of small various shapes such as bracelet type, stick type, and pencil type, and also, the external shape of the housing 1 can be small and portable various shapes such as ring type, bracelet type, stick type, and pencil type.

GLOSSARY OF DRAWING REFERENCES

1. Housing
2. Ring Type Holder
2A. Mounting Part
10. Control Unit
11. Light Sensor
11A. Light Reception Part
12. Acceleration Sensor
13. Angular Velocity Sensor
14. Direction Sensor
15. Atmospheric Pressure Sensor
16. Temperature Sensor
17X, 17Y, 17Z. Vibration Device
18. Communication Interface
19. Battery Unit
50. Virtual Object
100. Information Input and Output Apparatus

The invention claimed is:

1. A portable type information input and output apparatus comprising a portable housing, the portable type information input and output apparatus comprises in the housing:
   a first sensor for detecting a first environmental change in three-dimensional space;
   a second sensor for detecting a second environmental change in the three-dimensional space;
   an information output means composed of at least one vibration device; and
   a control means for performing a control to determine whether a detected output obtained by the first sensor exceeds a threshold value or not, and to obtain the second environmental change detected by the second sensor as an input information, when the detected output obtained by the first sensor exceeds the threshold value, and to generate an output signal according to the second environmental change in the three-dimensional space based on the obtained input information, and to output the generated output signal as a vibration information from an information output means,
   the portable type information input and output apparatus further comprises a ring type holder having a mounting part to which the housing is mounted removably,
   wherein the second sensor is a three-dimensional sensor for detecting one or more changes of position, posture, and direction in the three-dimensional space as the second environmental change in the three-dimensional space,
   the control means performs a control to obtain the second environmental change detected as one or more changes of position, posture, and direction in the three-dimensional space by the second sensor as the input information, when the detected output obtained by the first sensor exceeds the threshold value, and to output the output signal according to one or more changes of position, posture, and direction in the three-dimensional space as the vibration information from the information output means, and
   the housing is removably mounted to the mounting part of the ring type holder, and the housing is mounted to a finger via the ring type holder.

2. The portable type information input and output apparatus as claimed in claim 1,
   wherein the first sensor is a light sensor for detecting the first environmental change in the three-dimensional space as a change of light income, and
   the control means determines whether to be an information input state or not based on the first environmental change detected as the change of light income in the three-dimensional space by the light sensor, and obtains the second environmental change detected by the second sensor as the input information.

3. The portable type information input and output apparatus as claimed in claim 1,
wherein the first sensor is a pressure sensor for detecting the first environmental change in the three-dimensional space as a change of atmospheric pressure, and the control means determines whether to be an information input state or not based on the first environmental change detected as the change of atmospheric pressure in the three-dimensional space by the pressure sensor, and obtains the second environmental change detected by the second sensor as the input information.

4. The portable type information input and output apparatus as claimed in claim 2,
wherein the control means converts absolute numerical data or absolute value data obtained as the detected output by the first sensor to a relative amount and determines whether the relative amount exceeds the threshold value or not.

5. The portable type information input and output apparatus as claimed in claim 3,
wherein the control means converts absolute numerical data or absolute value data obtained as the detected output by the first sensor to a relative amount and determines whether the relative amount exceeds the threshold value or not.

6. The portable type information input and output apparatus as claimed in claim 1,
wherein the information output means is composed of a plurality of vibration devices disposed in three dimensions, and the control means performs a control to obtain the second environmental change detected by the second sensor as the input information, when the detected output obtained by the first sensor exceeds the threshold value, and to output the output signal according to one or more changes of position, posture, and direction in the three-dimensional space as a three-dimensional vibration information from the information output means.

7. The portable type information input and output apparatus as claimed in claim 6,
wherein the three dimensional sensor comprises acceleration sensor, angular velocity sensor, and direction sensor.

8. An information input and output method by a portable type information input and output apparatus comprising a portable housing, the method comprises:
mounting the housing to a finger via a ring type holder having a mounting part to which the housing is mounted removably;
determining whether a detected output by a first sensor for detecting a first environmental change in three-dimensional space exceeds a threshold value or not;
obtaining a second environmental change detected as one or more changes of position, posture, and direction in the three-dimensional space by a second sensor as an input information, when the detected output obtained by the first sensor exceeds the threshold value;
generating an output signal according to the second environmental change in the three-dimensional space based on the obtained input information; and
outputting the generated output signal as a vibration information from an information output means composed of at least one vibration device.

* * * * *